(12) United States Patent
Kang (10) Patent No.: US 8,990,484 B2
(45) Date of Patent: Mar. 24, 2015

(54) HEAP-BASED MECHANISM FOR EFFICIENT GARBAGE COLLECTION BLOCK SELECTION

(71) Applicant: Ho-Fan Kang, San Diego, CA (US)

(72) Inventor: Ho-Fan Kang, San Diego, CA (US)

(73) Assignee: Virtium Technology, Inc, Rancho Santa Margarita, CA (US)

( * ) Notice: Subject to any disclaimer, the term of this patent is extended or adjusted under 35 U.S.C. 154(b) by 283 days.

(21) Appl. No.: 13/715,903

(22) Filed: Dec. 14, 2012

(65) Prior Publication Data
US 2014/0173176 A1    Jun. 19, 2014

(51) Int. Cl.
G06F 12/00 (2006.01)
G06F 12/02 (2006.01)

(52) U.S. Cl.
CPC ................................. *G06F 12/0246* (2013.01)
USPC .......................................................... 711/103

(58) Field of Classification Search
None
See application file for complete search history.

(56) References Cited

U.S. PATENT DOCUMENTS 8,185,687 B2 *   5/2012   Matsuyama et al. .......... 711/103

* cited by examiner

*Primary Examiner* — Brian Peugh (57) ABSTRACT

N page counters are associated with N blocks in the flash subsystem. Each of the N page counters indicates a count of invalid pages in each corresponding block in the N blocks. A max heap structure is formed over the N page counters. At least one of the N page counters is updated each time the count changes. The max heap structure is updated each time the at least one of the N page counters is updated.

A maximum value is retrieved from a highest level of the max heap structure. The max heap structure is traversed down to lowest level using the maximum value at each level until reaching the lowest level. The lowest level corresponds to N page counters. One of the N blocks having associated page counter corresponds to the maximum value is identified as a candidate for block erasure.

20 Claims, 7 Drawing Sheets

HEAP-BASED MECHANISM FOR EFFICIENT GARBAGE COLLECTION BLOCK SELECTION

TECHNICAL FIELD

The presently disclosed embodiments are directed to the field of flash devices, and more specifically, to garbage collection in flash devices.

BACKGROUND

Flash memory devices (e.g., NAND flash devices) have become increasingly popular in data storage for computer systems, mobile devices, consumer devices (e.g., cameras). In many applications, it is important for flash devices to achieve high performance to satisfy the applications demands.

In a typical flash-based subsystem, pages in flash devices may become invalidated as result of frequent writing and updating. Over time, invalid pages may populate the memory subsystem such that free or available pages become increasingly less and less and scattered within the subsystem, leading to fragmentation. To improve the performance, a process called garbage collection cleans the memory subsystem by defragmenting the pages. Garbage collection typically involves two phases: selection and collection. In the selection phase, the best candidate for garbage collection is selected. In the collection phase, the valid pages in the selected block are copied elsewhere and then the block is erased. To reduce processing time, the best candidate ideally is the block that has the most invalid pages, or the least valid pages, so that the time to copy the valid pages is the fastest, resulting in efficient garbage collection. Selecting the best candidate for erasure during garbage collection is often a time-consuming process.

SUMMARY

One disclosed feature of the embodiments is a method and apparatus to provide an efficient block selection for garbage collection in a flash subsystem. N page counters are associated with N blocks in the flash subsystem. Each of the N page counters indicates a count of invalid pages in each corresponding block in the N blocks. A max heap structure is formed over the N page counters. At least one of the N page counters is updated each time the count of invalid pages of the at least one of the N page counters changes. The max heap structure is updated each time the at least one of the N page counters is updated.

In another embodiment, a maximum value is determined from a highest level of a max heap structure. The max heap structure is traversed down to lowest level using the maximum value at each level until reaching a final value at the lowest level. The lowest level corresponds to N page counters associated with N blocks in a flash subsystem. Each of the N page counters indicates a count of invalid pages in each corresponding block in the N blocks. One of the N blocks having associated page counter corresponds to the final value is identified as a candidate for block erasure.

BRIEF DESCRIPTION OF THE DRAWINGS

Embodiments may best be understood by referring to the following description and accompanying drawings that are used to illustrate embodiments. In the drawings.

DETAILED DESCRIPTION

One disclosed feature of the embodiments is a technique to provide an efficient block selection for garbage collection in a flash subsystem. N page counters are associated with N blocks in the flash subsystem. Each of the N page counters indicates a count of invalid pages in each corresponding block in the N blocks. A max heap structure is formed over the N page counters. At least one of the N page counters is updated each time the count of invalid pages of the at least one of the N page counters changes. The max heap structure is updated each time the at least one of the N page counters is updated.

In another embodiment, a maximum value is determined from a highest level of a max heap structure. The max heap structure is traversed down to lowest level using the maximum value at each level until reaching a final value at the lowest level. The lowest level corresponds to N page counters associated with N blocks in a flash subsystem. Each of the N page counters indicates a count of invalid pages in each corresponding block in the N blocks. One of the N blocks having associated page counter corresponds to the final value is identified as a candidate for block erasure.

In the following description, numerous specific details are set forth. However, it is understood that embodiments may be practiced without these specific details. In other instances, well-known circuits, structures, and techniques have not been shown to avoid. Obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

Figure 1:
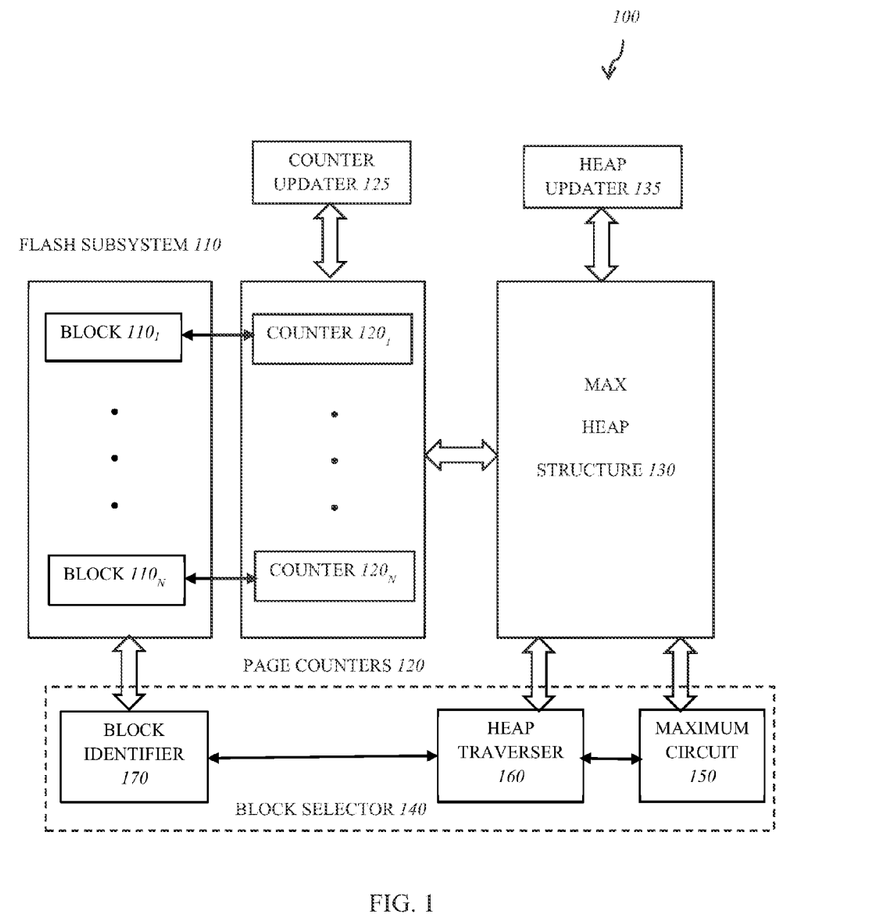
FIG. 1 is a diagram illustrating a system according to one embodiment.

FIG. 1 is a diagram illustrating a system 100 according to one embodiment. The system 100 includes a flash subsystem 110, a set of page counters 120, a max heap structure 130, and a block selector 140. The system 100 may include more or less than the above components. For example, the set of page counters 120 may be integrated with the max heap structure 130, or components in the flash block selector 140 may be separately implemented, or there may be additional peripheral devices or controllers that are connected to the block selector 140 such as a host processor, a flash controller, a wear-level processor, etc. In addition, any of these components may be implemented in hardware, software, firmware, or any combination of hardware, software, and firmware.

The flash subsystem 110 may be a subsystem of a number of flash devices. Each of the flash devices may be any semiconductor flash memory device such as a NAND flash memory, a NOR flash memory. It may be a single die or a multiple die device. Typically, the flash subsystem 110 may be used as a solid state drive (SSD). Each of the flash devices in the subsystem 110 may be organized in any configurations, such as 512 Mb to 128 Gb density, block size from 16K to 512K, page size from 512 to 8K, etc. The flash subsystem 110 may include IN blocks $110_1$ to $110_N$ where N is a positive integer. These blocks may come from a single device or multiple devices. The N blocks $110_1$ to $110_N$ typically are blocks in flash devices that are part of a pool used for garbage collection. When it is time for garbage collection, the system 100 may select a candidate block for erasure. The candidate block may be selected from one of the N blocks $110_1$ to $110_N$ based on some predefined criteria. One useful criteria may be the number of invalid pages in the block. When a block is selected for erasure, it may still have several valid pages. Therefore, before erasure, it may be necessary to copy these valid pages to other blocks. For fast processing time, it is desirable to have the least number of valid pages, or alternatively the most number of invalid pages, to be copied.

The page counters 120 are counters used to keep track of the number of invalid pages in each block. For N blocks, there may be N page counters $120_1$ to $120_N$, one for each block. The N page counters $120_1$ to $120_N$ are associated with the N blocks $110_1$ to $110_N$ in the flash subsystem 110. Each of the N page counters $120_1$ to $120_N$ may indicate a count of invalid pages in each corresponding block in the N blocks. For example, the page counter $120_m$ indicates a count of invalid pages in the block $110_m$. The counters $120_1$ to $120_N$ may be updated by a counter updater 125. The counter updater updates at least one of the N page counters each time the count of invalid pages of the at least one of the N page counters changes. This count of invalid pages may be changed as result of a write, a data update, an erasure, or any operation that may change the invalid status of a page.

The max heap structure 130 is coupled to the N page counters $120_1$ to $120_N$ to form a structure for a heap-based mechanism for block selection. The max heap structure 130 may be maintained and updated to prepare the max heap structure 130 in a bottom-up manner. This update process may be carried out during the normal operation of the system when each time the status of a page changes, or it may be part of the process to select a block for erasure at time of garbage collection. When it is time for garbage collection, the block selector 140 may operate on the max heap structure 130 to determine a candidate block in the flash subsystem 110. The max heap structure 130 may be updated by a heap updater 135. The heap updater 135 may update the max heap structure 130 each time at least one of the N page counters is updated.

The block selector 140 is coupled to the max heap structure and optionally to the flash subsystem 110 to select a candidate for block erasure in the N blocks. The block selector 140 may include a maximum circuit 150, a heap traverser 160, and a block identifier 170. The block selector 140 may include more or less than these components. For example, the maximum circuit 150 may not be necessary if the max heap structure 130 includes a root node, as will be discussed in the following. In addition, depending on the structure of the heap updater 135, it is possible that the block selector 140 may not be needed because the identity of the block that has the maximum value of the invalid pages may already have been determined during the update of the heap structure 130 by the heap updater 135.

The maximum circuit 150 retrieves a maximum value from a highest level of the max heap structure. The maximum circuit 150 may not be needed if the maximum value and the corresponding node have already been determined during the heap updating as will be discussed later. The heap traverser 160 may traverse the max heap structure 130 in a top-down manner from the highest level down to the lowest level using the maximum value at each level until reaching the lowest level. The lowest level corresponds to the N page counters. The block identifier 170 may identify one of the N blocks $110_1$ to $110_N$ having associated page counter that corresponds to the maximum value as the candidate for block erasure.

Figure 2:
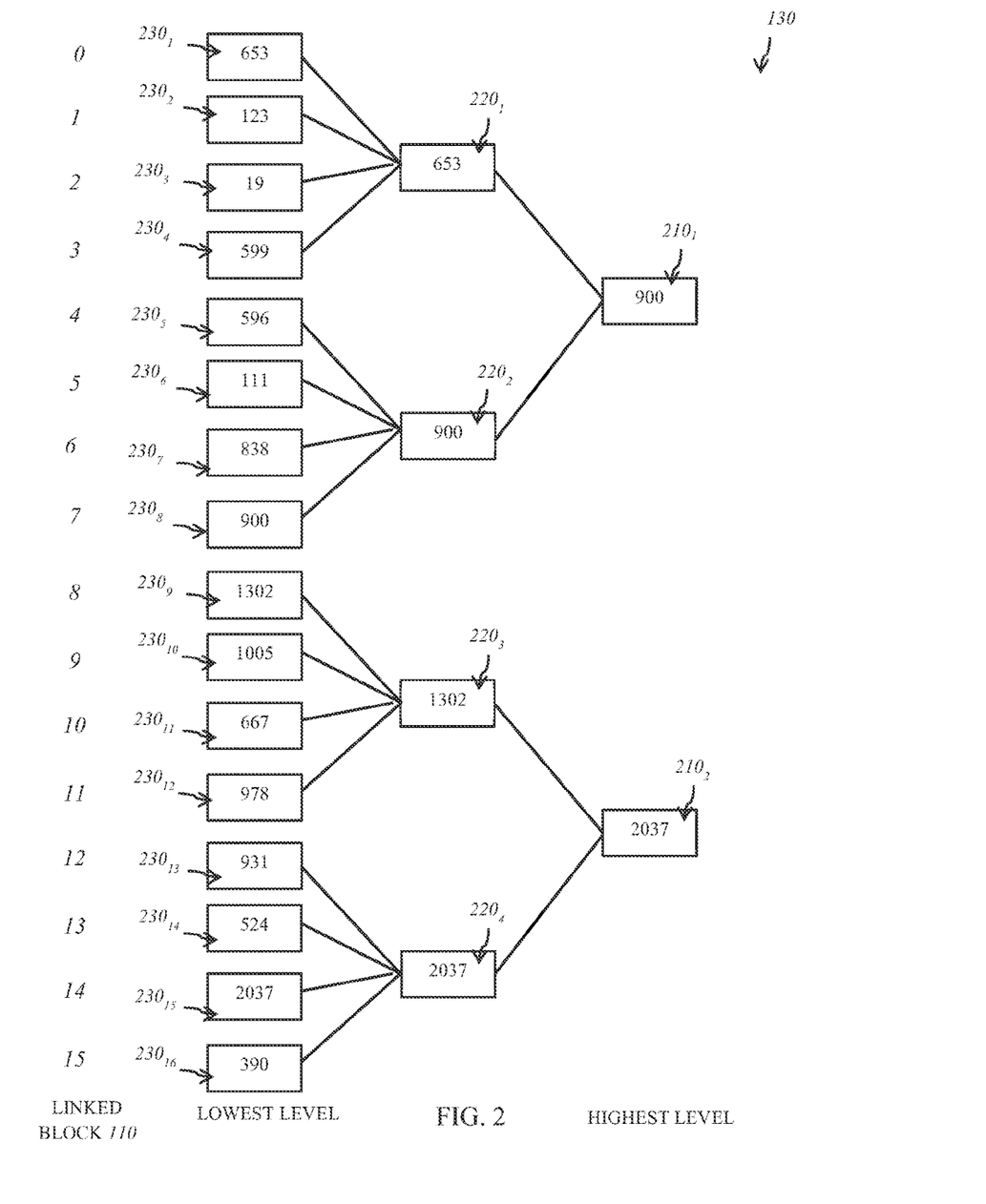
FIG. 2 is a diagram illustrating a max heap structure according to one embodiment.

FIG. 2 is a diagram illustrating the max heap structure 130 according to one embodiment. The max heap structure 130 may be formed by a tree having K levels in which the leaf nodes correspond to the N page counters $120_1$ to $120_N$ and each parent node has a plurality of child nodes and contains a maximum value of the plurality of child nodes. In other words, other than the leaf nodes which contain the values of the N page counters $120_1$ to $120_N$, all nodes in the tree contain the maximum values of their child nodes.

FIG. 2 provides an illustrative example of the max heap structure 130 with three levels (K=3). In this tree structure, the leaf nodes lie in the lowest level and the parent nodes are constructed starting from the leaf nodes until reaching the highest level. It is possible that the highest level has a root node that contains the maximum value of its child nodes. The number of levels (K) in the tree may be determined in advance according to some specified condition. Similarly, the number of child nodes of a parent node may be determined in advance according to some pre-defined criteria. The number of child nodes for a parent node in one level may be the same as or different from the number of child nodes for a parent node at another level. Furthermore, the number of child nodes of one parent node in a level may be the same as or different from the number of child nodes of another parent node in the same level. In most cases, once the structure of the tree is determined, it may remain fixed throughout its operation.

In this illustrative example, there are 16 linked blocks 110, numbered from 0 to 15. Accordingly, there are 16 leaf nodes $230_1$ to $230_{16}$ corresponding to counters $120_1$ to $120_N$, respectively. Each of these leaf nodes contains a count of the invalid pages in the corresponding block. In this example, the counts of the invalid pages in counters $120_1$ to $120_N$ (corresponding to blocks 0 to 15) are 653, 123, 19, 599, 596, 111, 838, 900, 1302, 1005, 667, 978, 931, 524, 2037, 390, respectively. At this level (level 3), four child nodes form into a parent node located at the next higher level (level 2). For example, leaf nodes $230_1$ to $230_4$ form into parent node $220_1$, leaf nodes $230_5$ to $230_8$ form into parent node $220_2$, leaf nodes $230_9$ to $230_{12}$ form into parent node $220_3$, leaf nodes $230_{13}$ to $230_{16}$ form into parent node $220_4$. From level 2 to level 1 (the highest level), two child nodes form into a parent node. For example, child nodes $220_1$ and $220_2$ form into parent node $210_1$, and child nodes $220_3$ and $220_4$ form into parent node $210_2$. As mentioned, a root node may be formed after the highest level, but it may not be necessary. Other than the leaf nodes, each of the nodes in the tree contains a value which is the maximum values of its child nodes. For example, the parent node $220_1$ at level 2 contains the value 653 which is the maximum value of the values in its child nodes (i.e., 653, 123, 19, and 599).

The tree structure of the max heap structure 130 allows values from the page counters to be propagated up to the highest level such that eventually maximum values of subgroups of the counts retain at the highest level. For example, the parent node $220_1$ at level 2 contains the value 653 which is the maximum value of the values in its child nodes (i.e., 653, 123, 19, and 599). At level 2, nodes $220_1, 220_2, 220_3,$ and $220_4$ contain the maximum values of their child nodes, which are 653, 900, 1302, and 2037, respectively. At level 1, nodes $210_1$ and $210_2$ contain the maximum values of their child nodes, which are 900 and 2037, respectively. When it is time to select the block, the process may start from the highest level where the maximum value for all of the N counters $120_1$ to $120_N$ may be determined and traverse down the tree to arrive at the counter that has the maximum value of all of the N counters $120_1$ to $120_N$. If a root node is included, then this maximum value has already been propagated to the root node and the process may start from the root node. Since the process only traverses the tree through the levels, the processing time is extremely fast. The processing time for this is O(logN).

For the up-traversal, initially the process may take O (NlogN) to propagate all the maximum values to the parent nodes through all the levels. Once this initial phase is done, subsequent updates caused by a change of value of one of the leaf nodes only take O (logN) to propagate through all the levels. Accordingly, it may be desirable to carry out the up propagation during the normal operation of the system, and not during garbage collection time.

In addition, the up-traversal process may be further improved by propagating not only the maximum values but also the identities of the corresponding counters. This way, when the time for garbage collection comes, it is only necessary to retrieve the identity of the counter and therefore the identity of the associated block that has the maximum value without the need for the down-traversal. This may increase the amount of information to propagate, but it improves the performance significantly because the identity of the candidate block has been constantly updated before the garbage collection time.

Figure 3:
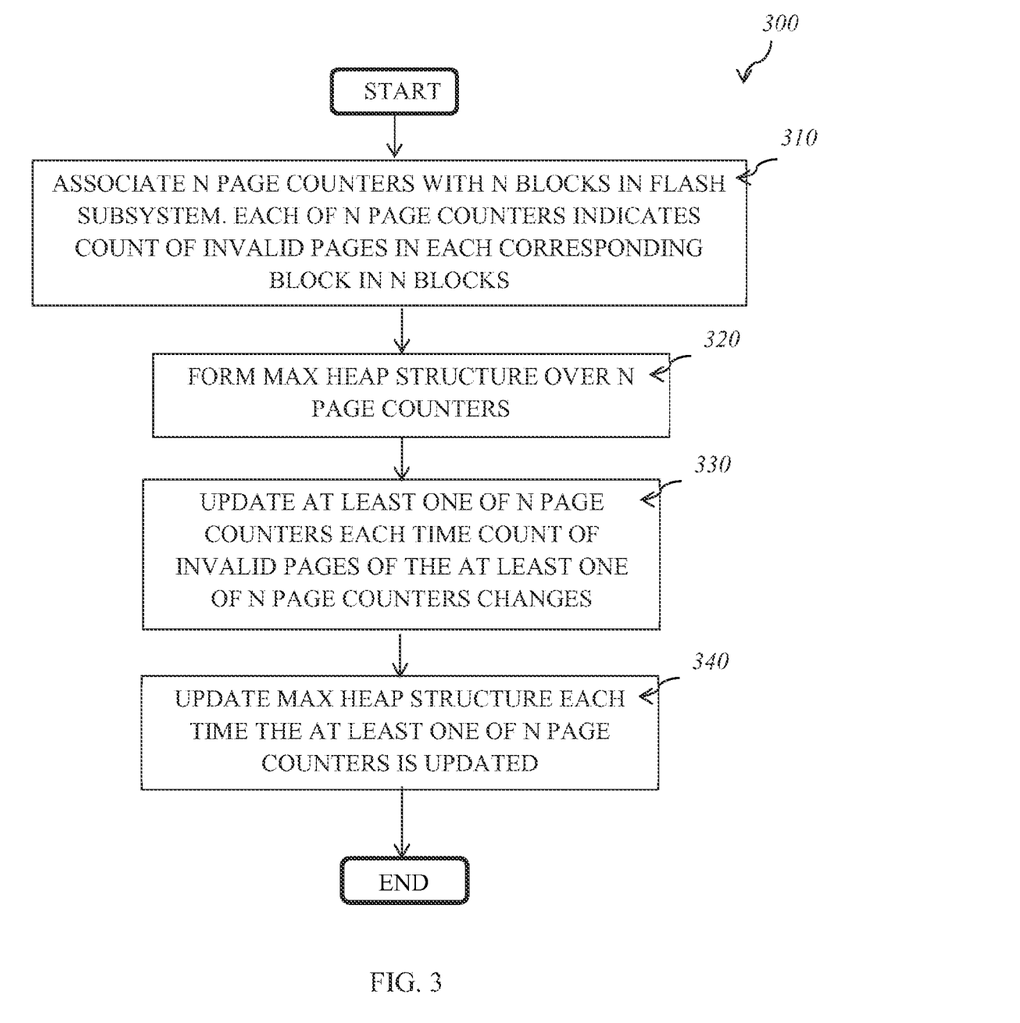
FIG. 3 is a flowchart illustrating a process to maintain the max heap structure according to one embodiment.

FIG. 3 is a flowchart illustrating a process 300 to maintain the max heap structure recording to one embodiment.

Upon START, the process 300 associates N page counters with N blocks in a flash subsystem (Block 310). Each of the N page counters indicates a count of invalid pages in each corresponding block in the N blocks. Next, the process 300 forms a max heap structure over the N page counters (Block 320). Then, the process 300 updates at least one of the N page counters each time the count of invalid pages of the at least one of the N page counters changes (Block 330). Next, the process 300 updates the max heap structure each time the at least one of the N page counters is updated (Block 340) and the process 300 is terminated. It should be noted that the blocks 310 and 320 are performed only once initially. Subsequently, as the counts of the invalid pages in the blocks change, only blocks 330 and 340 are performed.

Figure 4:
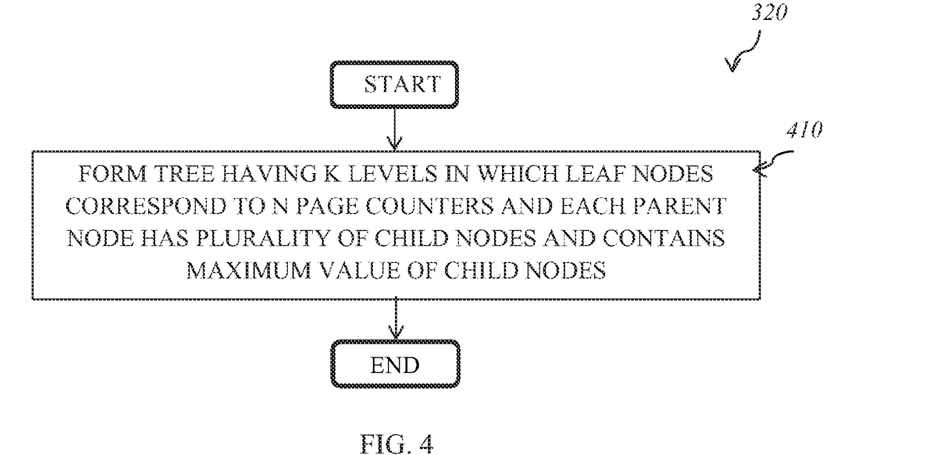
FIG. 4 is a flowchart illustrating a process to form the max heap structure according to one embodiment.

FIG. 4 is a flowchart illustrating the process 320 to form the max heap structure according to one embodiment.

Upon START, the process 320 forms a tree having K levels in which leaf nodes correspond to the N page counters and each parent node has a plurality of child nodes and contains a maximum value of the plurality of child nodes (Block 410). As discussed above, the configuration of the tree may be determined in advance such as the number of levels, the number of child nodes for each parent node, etc. The process 320 is then terminated.

Figure 5:
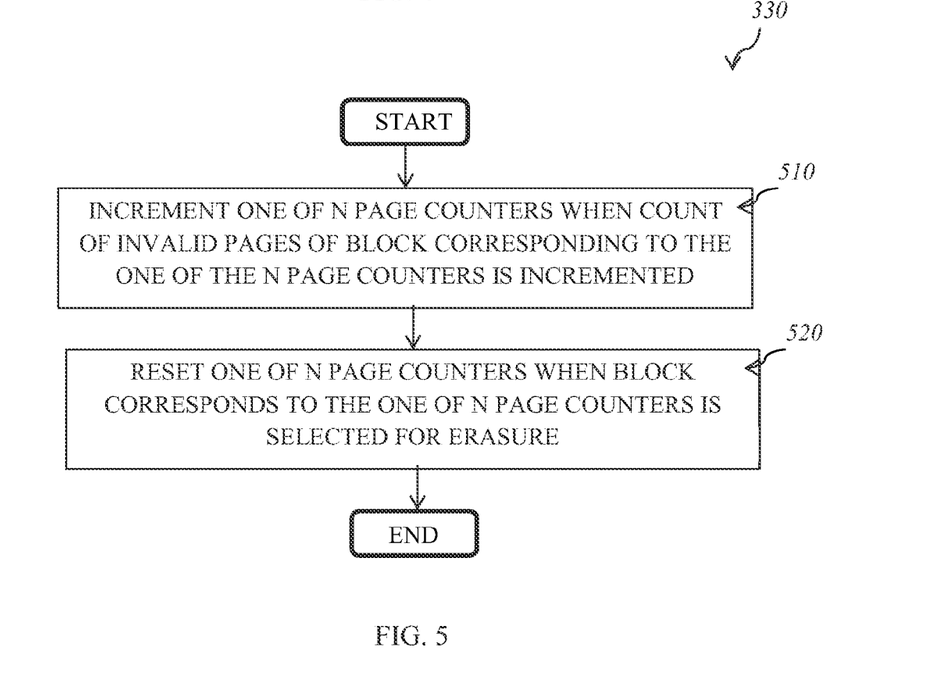
FIG. 5 is a flowchart illustrating a process to update the page counters according to one embodiment.

FIG. 5 is a flowchart illustrating the process 330 to update the page counters according to one embodiment. The page counters reflect the number of invalid pages in each block.

Upon START, the process 330 increments one of the N page counters when the count of the invalid pages of a block corresponding to the one of the N pages counters is incremented (Block 510). During normal operation, the number of invalid pages only increases. Then, the process 330 resets one of the N page counters when a block corresponding to the one of the N pages counters is selected for erasure (Block 520). Resetting a counter may indicate that the initial number of invalid pages is zero. When a block is erased, new data may be copied into the erased block and subsequent writes may render more and more pages to become invalid, for which block 510 may be performed. The process 330 is then terminated.

Figure 6:
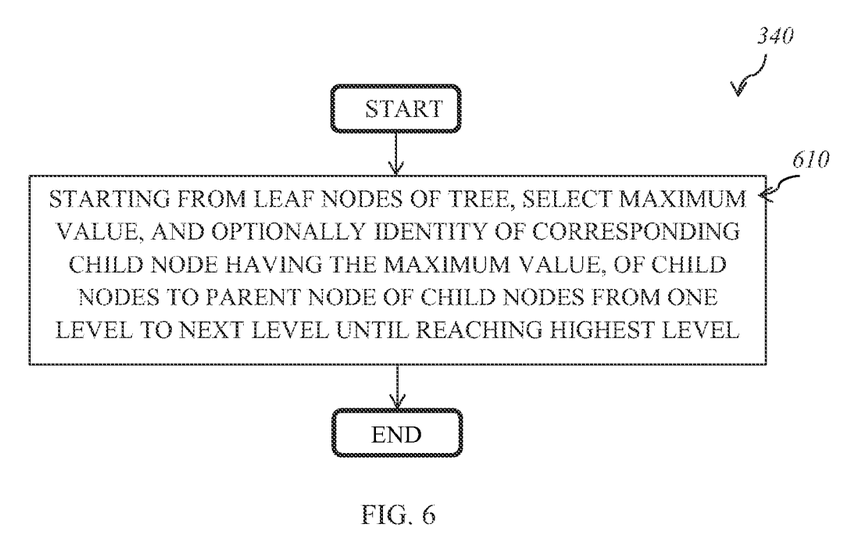
FIG. 6 is a flowchart illustrating a process to update the max heap structure according to one embodiment.

FIG. 6 is a flowchart, illustrating the process 340 to update the max heap structure according to one embodiments discussed above, the populating of the maximum values at each of the nodes in the tree, other than the leaf nodes, is performed for each group of parent-child nodes within the tree from the bottom up, i.e., from the leaf nodes at the lowest level to the highest level.

Upon START, the process 340, starting front the leaf nodes of the tree, selects a maximum value of child nodes to parent node of the child nodes from one level to next level until reaching the highest level (Block 610). This selection of the maximum value of the child nodes may be performed by comparing values of child nodes of each of the parent node to determine the maximum at the initial phase. Subsequently, each time a child node changes value, it is only necessary to compare this new value with the maximum value in the parent node to determine if this new value is a new maximum. Furthermore, as discussed earlier, it is possible to propagate the identities of the nodes together with the values to eliminate the need for the down traversal. The process 340 is then terminated.

Figure 7:
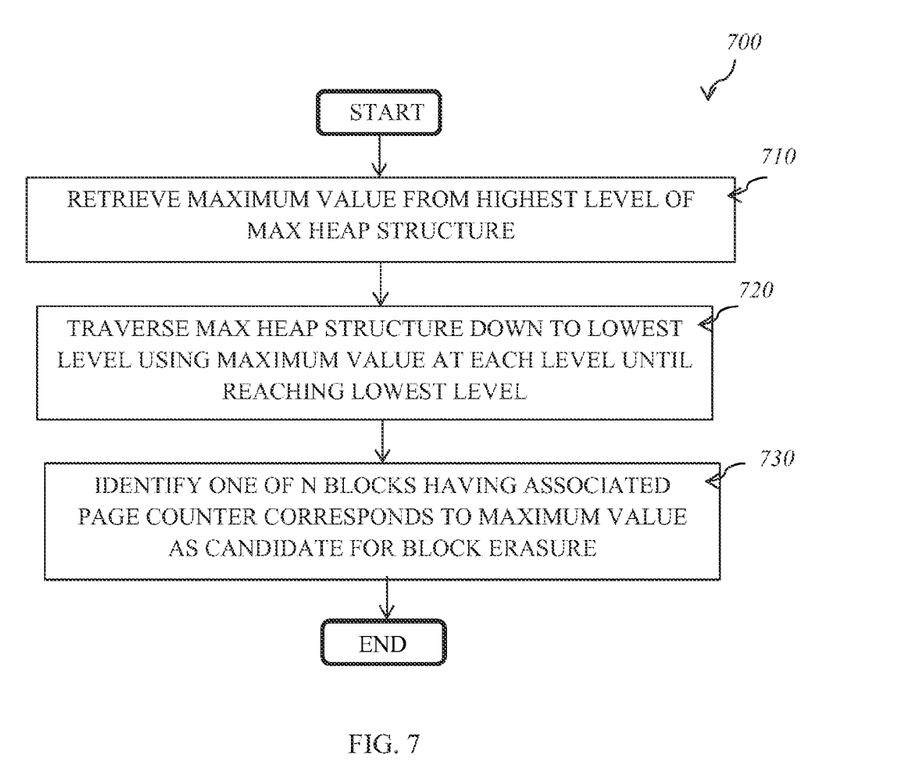
FIG. 7 is a flowchart illustrating a process to select a block candidate for erasure according to one embodiment.

FIG. 7 is a flowchart illustrating a process 700 to select a block candidate for erasure according to one embodiment. This process is typically performed at the time of garbage collection.

Upon START, the process 700 retrieves a maximum value from a highest level of a max heap structure (Block 710). The max heap structure is the tree structure as formed in the process 410 shown in FIG. 4. This operation may not be necessary if a root node is included in the tree because the maximum value has already been determined during the update of the heap structure as performed in block 610 in FIG. 6.

Next, the process 700 traverses the max heap structure from the highest level, or the root node if it is included in the tree, down to lowest level using the maximum value at each level until reaching the lowest level (Block 720). As discussed above, the lowest level (the leaf nodes) corresponds to N page counters associated with N blocks in a flash subsystem and each of the N page counters indicates a count of invalid pages in each corresponding block in the N blocks. Next, the process 700 identifies one of the N blocks having associated page counter that corresponds to the maximum value as a candidate for block erasure (Block 730).

Returning to FIG. 2, the process 700 starts at the highest level. The maximum value 2037 is determined at node $210_2$. From this level, the maximum value 2037 is used to traverse down the tree. The process 700 goes to node 2204 because it contains this maximum value 2037 at level 2. From this node, the process 700 goes down to node $230_{15}$ because it contains the maximum value 2037. Since this is at the lowest level, the process 700 stops and the node $230_{15}$ is identified as the node that contains the maximum value. This node corresponds to block 14. Accordingly, block 14 is identified as the block candidate for erasure.

Figure 8:
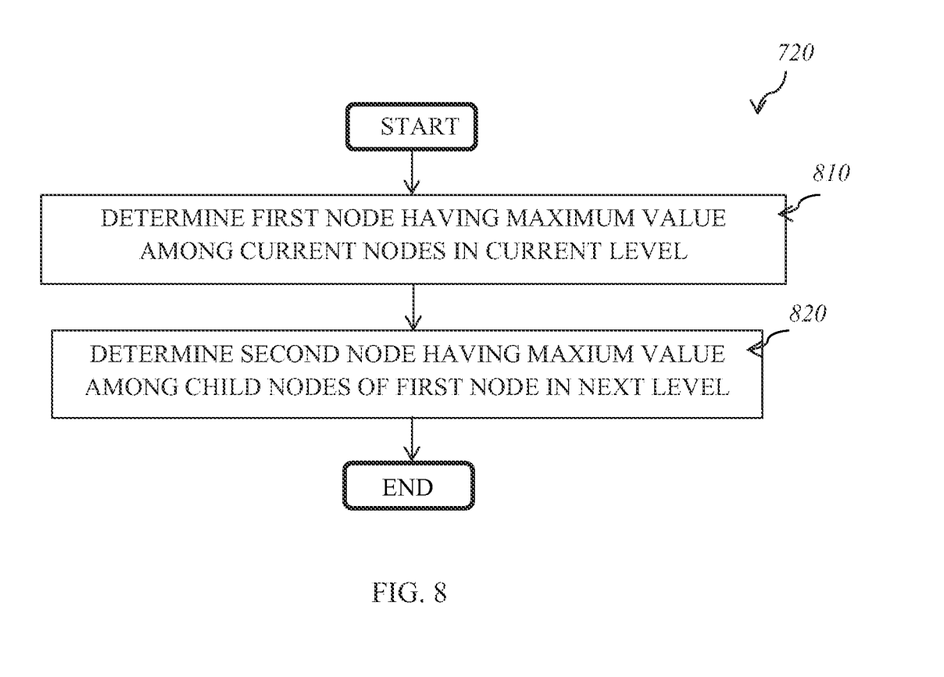
FIG. 8 is a flowchart illustrating a process to traverse the max heap structure according to one embodiment.

FIG. 8 is a flowchart illustrating the process 720 to traverse the max heap structure according to one embodiment. This process may be performed as often as necessary at each level for each node.

Upon START, the process 720 determines a first node (e.g., node $220_4$) having the maximum value among current nodes (e.g., nodes $220_3$ and $220_4$) in a current level level 2). Next, the process 720 determines a second node (e.g., node $230_{15}$) having the maximum value among child nodes (e.g., nodes $230_{13}$, $230_{14}$, $230_{15}$, and $230_{16}$) of the first node in a next level (e.g., level 3). The process 720 is then terminated.

The process 720 therefore essentially includes only comparisons of the maximum value among the child nodes of the current parent node to determine the node having that maximum value. After this node is determined, the process continues down to the lower level, narrowing down the search to only the child nodes of this node. The process continues until it reaches the last level, i.e., the lowest level.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
associating N page counters with N blocks in a flash subsystem, each of the N page counters indicating a count of invalid pages in each corresponding block in the N blocks;
forming a max heap structure over the N page counters;
updating at least one of the N page counters each time the count of invalid pages of the at least one of the N page counters changes; and
updating the max heap structure each time the at least one of the N page counters is updated.

2. The method of claim 1 wherein forming the max heap structure comprises:
forming a tree having K levels in which leaf nodes correspond to the N page counters and each parent node has a plurality of child nodes and contains a maximum value of the plurality of child nodes.

3. The method of claim 2 wherein updating the N page counters comprises:
incrementing one of the N page counters when the count of the invalid pages of a block corresponding to the one of the N pages counters is incremented; and
resetting one of the N page counters when a block corresponding to the one of the N pages counters is selected for erasure.

4. The method of claim 2 wherein updating the max heap structure comprises:
starting from the leaf nodes of the tree, selecting a maximum value, and optionally corresponding child node having the maximum value, of child nodes to parent node of the child nodes from one level to next level until reaching the highest level.

5. The method of claim 4 wherein selecting the maximum value of the child nodes comprises comparing values of child nodes of each of the parent node.

6. A method comprising:
retrieving a maximum value from a highest level of a max heap structure;

traversing the max heap structure down to lowest level using the maximum value at each level until reaching the lowest level, the lowest level corresponding to N page counters associated with N blocks in a flash subsystem, each of the N page counters indicating a count of invalid pages in each corresponding block in the N blocks;

identifying one of the N blocks having associated page counter that corresponds to the maximum value as a candidate for block erasure.

7. The method of claim 6 wherein the max heap structure is formed by a tree having K levels in which leaf nodes correspond to the N page counters and each parent node has a plurality of child nodes and contains a maximum value of the plurality of child nodes.

8. The method of claim 7 wherein traversing the max heap structure comprises:

determining a first node having the maximum value among current nodes in a current level; and determining a second node having the maximum value among child nodes of the first node in a next level.

9. The method of claim 8 wherein determining the first node comprises comparing the maximum value with values of the current nodes in the current level.

10. The method of claim 8 wherein determining the second node comprises comparing the maximum value with values of the child nodes in the next level.

11. A circuit comprising:

N page counters associated with N blocks in a flash subsystem, each of the N page counters indicating a count of invalid pages in each corresponding block in the N blocks;

a max heap structure coupled to the N page counters;

a counter updater to update at least one of the N page counters each time the count of invalid pages of the at least one of the N page counters changes; and a heap updater to update the max heap structure each time the at least one of the N page counters is updated.

12. The circuit of claim 11 wherein the max heap structure comprises:

a tree having K levels in which leaf nodes correspond to the N page counters and each parent node has a plurality of child nodes and contains a maximum value of the plurality of child nodes.

13. The circuit of claim 12 wherein the counter updater increments one of the N page counters when the count of the invalid pages of a block corresponding to the one of the N pages counters is incremented, and resets one of the N page counters when a block corresponding to the one of the N pages counters is selected for erasure.

14. The circuit of claim 12 wherein the heap updater, starting from the leaf nodes of the tree, selects a maximum value, and optionally identity of corresponding child node having the maximum value, of child nodes to parent node of the child nodes from one level to next level until reaching the highest level.

15. The circuit of claim 14 wherein the heap updater selects the maximum value of the child nodes by comparing values of child nodes of each of the parent node.

16. A circuit comprising:

N page counters associated with N blocks in a flash subsystem, each of the N page counters indicating a count of invalid pages in each corresponding block in the N blocks;

a max heap structure coupled to the N page counters; and a block selector coupled to the max heap structure to select a candidate for block erasure in the N blocks, the block selector comprising:

a maximum circuit to retrieve a maximum value from a highest level of the max heap structure, a heap traverser to traverse the max heap structure down to lowest level using the maximum value at each level until reaching the lowest level, the lowest level corresponding to the N page counters, and a block identifier to identity one of the N blocks having associated page counter that corresponds to the maximum value as the candidate for block erasure.

17. The circuit of claim 16 wherein the max heap structure comprises a tree having K levels in which leaf nodes correspond to the N page counters and each parent node has a plurality of child nodes and contains a maximum value of the plurality of child nodes.

18. The circuit of claim 17 wherein the traverser determines a first node having the maximum value among current nodes in a current level, and determines a second node having the maximum value among child nodes of the first node in a next level.

19. The circuit of claim 18 wherein the traverser determines the first node by comparing the maximum value with values of the current nodes in the current level.

20. The circuit of claim 18 wherein the traverser determines the second node by comparing the maximum value with values of the child nodes in the next level.

* * * * *